(12) United States Patent
Ruan et al.

(10) Patent No.: US 10,936,360 B2
(45) Date of Patent: Mar. 2, 2021

(54) METHODS AND DEVICES OF BATCH PROCESS OF CONTENT MANAGEMENT

(71) Applicant: EMC IP Holding Company LLC, Hopkinton, MA (US)

(72) Inventors: Wei Ruan, Shanghai (CN); Jason Chen, Shanghai (CN); Wei Zhou, Shanghai (CN); Chen Wang, Shanghai (CN); Zed Minhong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 15/710,111

(22) Filed: Sep. 20, 2017

(65) Prior Publication Data

US 2018/0088984 A1    Mar. 29, 2018

(30) Foreign Application Priority Data

Sep. 23, 2016   (CN) .......................... 2016 1 0847714

(51) Int. Cl.
*G06F 15/16*    (2006.01)
*G06F 9/48*    (2006.01)

(52) U.S. Cl.
CPC .................. *G06F 9/4843* (2013.01)

(58) Field of Classification Search
CPC ...................................................... G06F 9/4843
USPC ........................................................... 709/203
See application file for complete search history.

(56) References Cited

U.S. PATENT DOCUMENTS

| 7,277,855 | B1 * | 10/2007 | Acker | ..................... G10L 13/02 704/260 |
| 9,154,296 | B1 | 10/2015 | O'Connell | |
| 9,432,484 | B1 | 8/2016 | Xie et al. | |
| 2001/0018708 | A1 * | 8/2001 | Shisler | ..................... H04L 29/06 709/220 |
| 2001/0051962 | A1 * | 12/2001 | Plotkin | ................. G06F 16/958 715/229 |
| 2006/0248335 | A1 * | 11/2006 | Frazier | ................ H04L 41/0806 713/168 |
| 2009/0183117 | A1 * | 7/2009 | Chang | ................... G06F 17/248 715/810 |
| 2010/0058170 | A1 * | 3/2010 | Demant | .................. G06Q 10/10 715/234 |
| 2010/0115400 | A1 * | 5/2010 | Yamanakajima | ..... G06F 40/186 715/243 |
| 2012/0131582 | A1 * | 5/2012 | Zhao | ...................... G06Q 40/02 718/101 |

(Continued)

*Primary Examiner* — Hannah S Wang
(74) *Attorney, Agent, or Firm* — BainwoodHuang

(57) ABSTRACT

Embodiments of the present disclosure provide a method and device for of processing a batch process including a plurality of content management service operations. The method, comprises: determining, at a client, a batch process template associated with the batch process, the batch process template including shareable information and at least one variable field of the plurality of content management service operations; determining a value of the at least one variable field; generating, based on the determined batch process template and the value, a first request for performing the batch process template; and sending the first request to a server. Embodiments of the present disclosure further provide a corresponding method performed at a server side, and a corresponding device.

11 Claims, 6 Drawing Sheets

(56) References Cited

U.S. PATENT DOCUMENTS

| | | | | |
|---|---|---|---|---|
| 2012/0330917 A1* | 12/2012 | Wei | ................... | G06F 16/2365 |
| | | | | 707/703 |
| 2013/0191723 A1* | 7/2013 | Pappas | ................... | G06F 16/86 |
| | | | | 715/234 |
| 2015/0334207 A1* | 11/2015 | Kane | ................... | H04W 4/08 |
| | | | | 709/203 |
| 2019/0129577 A1 | 5/2019 | Zhang et al. | | |

* cited by examiner

METHODS AND DEVICES OF BATCH PROCESS OF CONTENT MANAGEMENT

RELATED APPLICATIONS

This application claim priority from Chinese Patent Application Number CN201610847714.5, filed on Sep. 23, 2016 at the State Intellectual Property Office, China, titled "METHOD AND DEVICE FOR CONTENT MANAGEMENT BATCH" the contents of which is herein incorporated by reference in its entirety.

FIELD

Embodiments of the present disclosure generally relate to the field of processing of content management services, and more specifically, to methods and devices of a batch process of content management.

BACKGROUND

In environment of Big Data applications, in particular in content management systems, REpresentational State Transfer (REST) software architecture draws more and more attention. In services of satisfying RESTful, a batch process service has its own unique advantages. It combines a plurality of operations (e.g. operations of content management service) into one user transaction, and thus improves efficiency of services and reduces communication overhead. On the other hand, the batch process service enables the user to control the whole batch behavior, which is particularly advantageous in some application scenarios. However, there are still restrictions on the current batch process service. For example, the batch process is not reusable, or in some cases, the batch process with all operation requests and information thereof becomes an exceedingly "huge" request, etc. As a result, there is a need to improve the batch process for coping with these restrictions, and to provide a more flexible and efficient, as well as easy to use, batch process of content management.

SUMMARY

In general, embodiments of the present disclosure provide a solution of optimizing processing of content management services by improving batch process of content management.

According to a first aspect of the present disclosure, a method of processing a batch process including a plurality of content management service operations is provided. The method comprises: determining, at a client, a batch process template associated with the batch process, the batch process template including shareable information and at least one variable field of the plurality of content management service operations; determining a value of the at least one variable field; generating, based on the determined batch process template and the value, a first request for performing the batch process template; and sending the first request to a server.

According to a second aspect of the present disclosure, a method of processing a batch process including a plurality of content management service operations is provided. The method comprises: receiving a first request for performing a batch process template from a client, the first request comprising an identifier of the batch process template, and the batch process template including shareable information and at least one variable field of the plurality of content management service operations; determining a value of the at least one variable field based on the first request; and filling the value into the batch process template identified by the identifier to perform the batch process template.

According to a third aspect of the present disclosure, an electronic apparatus is provided. The apparatus comprises: a processing unit; a memory coupled to the processing unit, the memory, with the processing unit, being configured to cause the electronic apparatus to perform acts comprising: determining, at a client, a batch process template associated with the batch process, the batch process template including shareable information and at least one variable field of the plurality of content management service operations; determining a value of the at least one variable field; generating, based on the determined batch process template and the value, a first request for performing the batch process template; and sending the first request to a server According to a fourth aspect of the present disclosure, an electronic apparatus is provided. The apparatus comprises: a processing unit, a memory coupled to the processing unit, the memory, with the processing unit, being configured to cause the electronic apparatus to perform acts comprising: receiving a first request for performing a batch process template from a client, the first request comprising an identifier of the batch process template, and the batch process template including shareable information and at least one variable field of the plurality of content management service operations; determining a value of the at least one variable field based on the first request; and filling the value into the batch process template identified by the identifier to perform the batch process template.

According to a fifth aspect of the present disclosure, there is provided a computer readable storage medium having computer readable program instructions stored thereon. The computer readable program instructions, when executed by one or more processors, cause the one or more processors to carry out the methods according to the first and second aspects of the present disclosure.

BRIEF DESCRIPTION OF THE DRAWINGS

Through the following detailed description with reference to the accompanying drawings, the above and other features, advantages and aspects of embodiments of the present disclosure will become more apparent. In the drawings, identical or similar reference signs represent identical or similar elements, wherein.

DETAILED DESCRIPTION OF EMBODIMENTS

Figure 1:
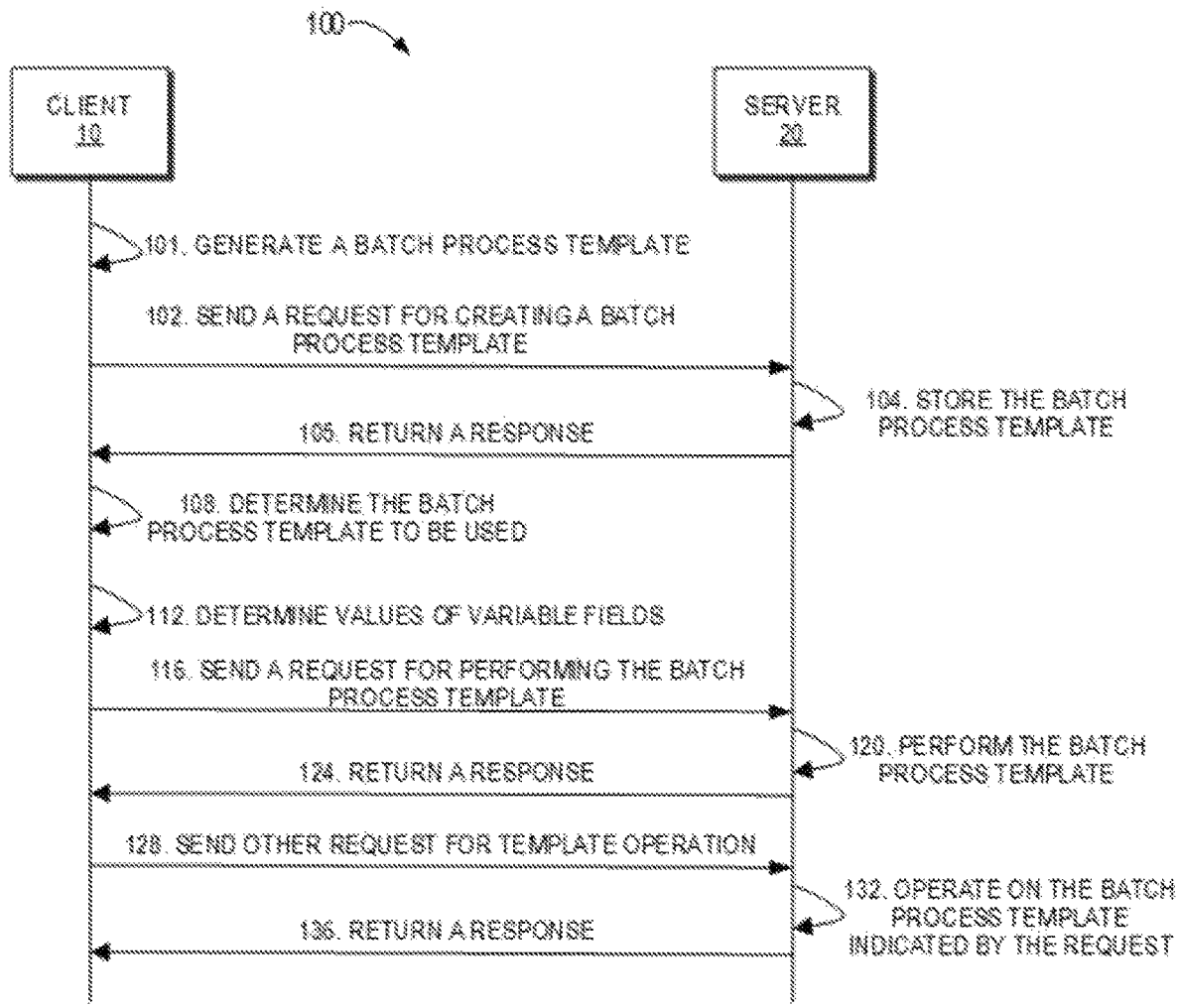
FIG. 1 illustrates a procedure of batch process template processing according to an embodiment of the present disclosure.

Embodiments of the present disclosure will now be described with reference to the drawings. It should be appreciated that similar members or functionality components in the drawings may be represented by identical numerals. The drawings are only intended to illustrate embodiments of the present disclosure. Those skilled in the art may obtain alternative embodiments from the following description without departing from the spirit and protection scope of the present disclosure.

As used herein, the term "includes" and its variants are to be read as open-ended terms that mean "includes, but is not limited to." The term "based on" is to be read as "based at least in part on." The term "one example embodiment" is to be read as "at least one example embodiment." The term "another embodiment" is to be read as "at least one another embodiment."

To facilitate discussion, the RESTful service and the batch process therein are taken as an example herein to describe the embodiments of the present disclosure in detail. The batch process in the RESTful service refers to a series of resource operations performed on the RESTful service by using specific batch resources. The following first introduces the batch process in RESTful services. It would be appreciated that demands on the batch process may be varied with different resource operations, different user scenarios or different products, and the content management service is taken herein as an example to describe basic conceptions of the present disclosure. Further, the example is given only with an Extensive Markup Language (XML), and it would be appreciated that JavaScript Object Notation (JSON) or other formats may be used.

In order to implement the batch process service, support of a corresponding batch protocol may be needed to perform several single operations in a batch process. The batch protocol for example includes resource definitions related to the batch process, operation definitions related to the batch process, etc. This will not be discussed herein in detail. Example (1) illustrates a batch process of creating a plurality of documents, and corresponding example code thereof is shown below.

EXAMPLE CODE (1)

```
POST http://localhost/batches
Content-Type: application/vnd.emc.documentum+json
Accept: application/vnd.emc.documentum+json
{
    "description" : "batch to create documents"
    "synchronous" : true,
    "transactional" : true,
    "sequential" : true,
    "on-error" : "fail",
      "operations" = [
    {
        "id" : "0001",
        "request" : {
          "method" : "POST",
          "uri" : "http://localhost/folders/folder_xx/documents",
          "headers" : [
              {"Content-Type" : "application/vnd.emc.documentum+json"},
              {"Accept" : "application/vnd.emc.documentum+json"}
          ],
          "entity" : "{
                  \"type\" : \"dm_document\",
                  \"properties\" : {
                  \"object_name\" : \"document 1\",
                  \"title\" : \"my first document\",
                  \"keyword\" : \"doc\",
                  . . .
                  }
                }"
        }
    },
    {
        "id" : "0002",
        "request" : {
          "method" : "POST",
          "uri" : "http://localhost/folders/folder_xx/documents",
          "headers" : [
              {"Content-Type" : "application/vnd.emc.documentum+json"},
              {"Accept" : "application/vnd.emc.documentum+json"}
          ],
          "entity" : "{
                  \"type\" : \"dm_document\",
                  \"properties\" : {
                  \"object_name\" : \"document 2\",
                  \"title\" : \"my second document\",
                  \"keyword\" : \"doc\",
                  . . .
                  }
                }"
        }
    },
    {
        . . . (other 998 operations)
    },
    ]
}
```

In the Example (1), the batch process comprises 1000 operations for creating 1000 files. It is seen that the batch process has attributes or options including "synchronous". "transactional", "sequential", "on-error", etc. As an example, the batch process has the following attribute values:

The value of "synchronous" attribute is "true". i.e., the client waits for a response until the server completes the operations. When a request for a batch process (namely, a batch request hereinafter) is transmitted to the server, the server makes a response only when all the operations are finished. Results of all the operations will be fed back to the client at one time.

The value of "transactional" attribute is "true", i.e., an operation collection is processed as a single unit, such that an operation collection performed by one process is not interrupted by another process. Also, all the operations in the batch process may be globally controlled, for example, if one document is failed to be created, creating of all other documents will be terminated.

The value of "sequential" attribute is "true", i.e., operations in the batch process are performed in a submission sequence.

The value of "on-error" attribute is "true", i.e., when one or more operations in the batch process fails, the whole batch of operations will be terminated rather than continuing to be performed.

It is seen from the Example (1) that, by using a batch protocol, several operations are transmitted in one request, and the user is enabled to control a behavior of the whole batch. Moreover, it is also seen that this type of batch process has some drawbacks, for example, the batch process comprises a large number of redundant information: it is much more complicated than transmitting a single request; the batch request is a 'huge' request with all operations request and other information, the batch process is not reusable, etc. This not only affects the executing efficiency and brings difficulty to the user in use, but also may result in adverse influences on the performance of the content management system in some cases. For example, since the batch process cannot be reused, the user at different application scenarios has to configure different batch processes, and the batch processes also contain parameters affecting the performance. That is, if the request is transactional or synchronous, or is processed in parallel, incorrect parameters set by the user will cause unnecessary reduction in performance, or even result in an incorrect behavior at worst.

One approach for mitigating or solving the above problem is to extend the batch protocol and extract common information in the batch to gather together. Example (2) illustrates such an enhanced batch process, and corresponding example code thereof is shown below.

EXAMPLE CODE (2)

```
POST http://localhost/batches
Content-Type: application/vnd.emc.documentum+json
Accept: application/vnd.emc.documentum+json
{
    "description" : "batch to create documents"
    "synchronous" : true,
    "transactional" : true,
    "sequential" : true,
    "on-error" : "fail",
    "return-request" : true,
    //new common part for the operations
    "batch-request" : {
        "method" : "POST",
        "uri" : "http://localhost/folders/folder_xx/documents",
        "headers" : [
            {"Content-Type" : "application/vnd.emc.documentum+json"},
            {"Accept" : "application/vnd.emc.documentum+json"}
        ]
    }
    "operations" : [
    {
      "id" : "0001",
      "description" : "create document 1",
      "request". : {
        "entity" : "{
            \"type\" : \"dm_document\",
            \"properties\" : {
            \"object_name\" : \"document 1\",
            \"title\" : \"my first document\",
            \"keyword\" : \"doc\",
            . . .
            }
        }"
      }
    },
    {
      "id" : "0002",
      "description" : "create document 2",
      "request" : {
        "entity" : "{
            \"type\" : \"dm_document\",
            \"properties\" : {
            \"object_name\" : \"document 2\",
```

```
            \"title\" : \"my first document\",
            \"keyword\" : \"doc\",
            . . .
          }
        }
      }"
    }
  },
  {
    . . . (another 998 operations)
  },
  ]
}
```

In the Example (2), the duplicated information is removed by adding a common portion "batch-request". As compared to the Example (1), the enhanced batch process is simplifier, but a key restraint is that the batch process only supports one type of operation. Using the "batch-request", it only supports the identical operation having identical "method", resource (i.e., "uniform resource identifier (URI)"), "headers", etc. If there are two different types of operations, or there is the same operation with different IDs, for example, it is required to create 500 documents under the folder "a" and, to create another 500 documents under the folder "b", it is not possible to be implemented in one batch process. As a matter of fact, any supported operations should be able to be performed in one batch process.

In order to solve the above potential problems of the batch process of content management services, embodiments of the present disclosure provide a solution of improving the batch process including a plurality of content management service operations. In the embodiments of the present disclosure, by only transmitting duplicate information once, various operations can share the information to implement a more flexible and efficient batch process. The duplicate information for example may be pre-configured in a form of template, so the client only needs to provide some variables in the template to the server when the content management service is to be processed. The server then applies these variables to the template, and the batch process is performed correspondingly, Now a batch process template and the resources related to the batch process template as used in the embodiments of the present disclosure will be described below. According to embodiments of the present disclosure, the batch process template has two models (also called representations), one of which is used to manage the batch process template itself and the other of which is to submit the values for the template to be performed. Except for some features or fields with variable values, the batch process template should share the same model with the batch model, so as to be better compatible with the existing batch models. Example (3) illustrates a batch process template representation, and corresponding example code thereof is shown below.

EXAMPLE CODE (3)

```
{
  "description" : <description for the batch>
  "synchronous" : <true, or false>,
  "transactional" : <true, or false>,
  "sequential" : <true, or false>,
  "on-error" : <fail, or continue>,
  "opertions" : [
    {
      "id" : VARIABLE,
      "description" : "fixed value" or VARIABLE,
      "request" : {
        "method" : "fixed value" or VARIABLE,
        "uri" : "fixed value" or VARIABLE,
        "headers" : [
          {"fixed value" or VARIABLE, "fixed value" or VARIABLE, },
          . . .
        ],
        "entity" {"fixed value" or VARIABLE,}
      }
    },
    {
      //other operation template when need
    },
    . . .
  ]
}
```

It is seen from the batch process template representation that the batch process template includes shareable information and variable fields (also called variables) of a plurality of content management service operations. The shareable information may be for example operation attributes or features of the batch process, such as "synchronous", "transactional" attributes in the example (3), etc., or a field with a fixed value in each operation, such as "method" "URI" or other field with a fixed value In order to perform the batch process template, variable values should be provided to fill in the template to perform the batch process template. The batch process template value model is introduced to pass on the values to the template. The batch process template defines several variables which may be used in any place within the operation definition, except the read-only values. For example, the following three types of variables are defined:

- A single-value variable: the variable has only one value and it will be used to all the operations which have the variable defined but will not expand the operation template. In one example, the single variable in the batch process template may be represented by for example '${ }'.
- A value repeating variable: the variable defines a series of values, and each value can be expanded to the operation template where the variable is defined. In one example embodiment, the repeating variable in the batch process template may be represented by for example '$[ ]'.
- A system defined variable: the variable is automatically given a value by the system (server) based on a pre-definition. In one example embodiment, the system defined variable in the batch process template may be represented by for example '$dctm_xx'.

In the above three types of variables, the user needs to provide single variables and repeating variables to perform the batch process template. Example (4) illustrates a batch process template value representation, and corresponding example code thereof is shown below.

EXAMPLE CODE (4)

```
{
    "single-variable": ... ,
    "repeating-variable": [ ... ]
}
```

The system defined variables are advantageous in certain application scenarios. One example is provided for a media type, such as Content-Type and Accept. Assuming that the batch process template is submitted by application/vnd.emc.documentum+xml, the Content-Type and Accept in the batch process template are application/vnd.emc.documentum+xml. When the user submits the batch in a JSON format, the Content-Type and Accept may have incorrect values and the client has no way to set them In this case, the batch process template may provide system defined variables, such as $dctm_mediatype_single, $dctm_mediatype_collection. The user may then create a template with Example (5), and corresponding example code thereof is shown below.

EXAMPLE CODE (5)

```
<batch-template>
  <operations>
    <operation id="$dctm_id">
      <request method="POST" uri="$[group-users-uri]">
        <header                             name="Content-Type" value="$dctm_mediatype_single"/>
        <header name="Accept" value="$dctm_mediatype_single"/>"
      </request>
    </operation>
  </operations>
</batch-template>
```

When the user submits the batch in XML format, the variable $dctm_mediatype_single is automatically replaced by application/vnd.emc.documentum+xml, and the variable $dctm_mediatype_collection is automatically replaced by application/atom+xml. On the other hand, if the batch is submitted in JSON format, both $dctm_mediatype_single and $dctm_mediatype_collection will be application/vnd.emc.documentum+json.

Another example of the system defined variable is an operation ID. Generally, each batch operation needs an operation ID. The batch with template also provides such behavior. When the batch process template is defined, the operation ID may be defined accordingly. Two types of operation ids may be defined. One type is that the operation ID is automatically generated by the server with an increased sequence, and $dcm_id may be used. When the batch variable is submitted, the operation ID does not need to be transmitted to the server. The other type is that the operation ID is defined as a normal repeating variable, and a customized value is submitted. Example (6) illustrates an operation ID for the first type, Example (7) illustrates an operation ID for the second type, and example codes thereof are respectively shown below.

EXAMPLE CODE (6)

```
<batch-template>
  <operations>
    <operation id="$dctm_id">
      ...
    </operation>
    <operation id="$dctm_id">
      ...
    </operation>
  </operations>
</batch-template>
<batch-template-value ref=" ... ">
  ...
</batch-template-value>
```

EXAMPLE CODE (7)

```
<batch-template>
  <operations>
    <operation id="$[operation_id_1]">
      ...
    </operation>
    <operatiot id="$[operation_id_2]">
      ...
    </operation>
  </operations>
</batch-template>
<batch-template-value ref=" ... ">
  ...
```

```
          <operation_id_1>
            <item>op1_id1</item>
            <item>op1_id2</item>
          </operation_id_1>
          <operation_id_2>
            <item>op2_id1</item>
            <item>op2_id2</item>
          </operation_id_2>
        </batch-template-value>
```

Therefore, the server determines field values of system defined fields for a plurality of content management service operations based on the types of the system defined variables. For example, as for the aforementioned media type, the media types of the content management service operations are determined based on different conditions: as for the operation ID, the value of operation ID is determined for each of the plurality of content management service operations based on for example the aforementioned two conditions.

The RESTful service defines a series of resources which may be manipulated through an HTTP method. According to embodiments of the present disclosure, there are two resources related to the batch process template. i.e., batch process template collection resource and batch process template resource. The batch process template collection resource is the top resource in the RESTful Services, which is a collection container for all batch process templates created in a repository or a tenant. The batch process template collection resource allows users to create new batch process templates in the collection, and also allows users to retrieve the batch process template collection.

The batch process template collection resource may be used to create new batch process templates and retrieve all the created batch process templates. For example, on the existing home document resource, repository resource or tenant resource, there may be a new link relation pointing to the batch process template resource: http://identifiers.emc-.com/linkrel/batch-templates. Based on the link relation, the client may use a GET method from the HTTP methods to obtain all the created batch process templates; or in order to create a new batch process template, the client may POST a new batch process template to the batch process template collection.

A batch process template resource is a single instance of the batch process template in a repository or a tenant and created by a particular user. The batch process template resource may be public or private, and may also be modified or deleted. To facilitate of use, the batch process template preferably has the same representation with the batch. It is worth noting that batch options are not replaceable by variables. The batch options are directly applied by the batch process template to the newly created batch. Next time when creating the batch, the client, only needs to provide values of all required variables.

The batch process template resource may be used to perform the batch process template with variable values, obtain a signal batch process template, update a single batch process template and remove a single batch process template. For example, the client may use the GET method from the HTTP methods to obtain a single batch process template; the client may use a PUT method from the HTTP methods to update a single batch process template; the client may use a DELETE method from the HTTP methods to remove a single batch process template; or in order to perform a batch process template, the client may POST to the batch process template values of the variables and the information related to the batch process template.

An embodiment of the present disclosure will be described below with reference to FIG. 1. FIG. 1 illustrates a process 100 of batch process template processing according to an embodiment of the present disclosure, which is mainly based on a client-server operation mode. In the embodiment, a batch process of content management service is taken as an example, i.e., the content management system includes a client 10 and a server 20. The batch process template, as described above, may be stored in for example the server 20, the client 10 may use different HTTP methods to send requests for batch process template operations to the server 20, as described above, and the server 20 returns back responses to these requests correspondingly.

In the process 100, it is shown that the client 10 generates (101) a batch process template. In one embodiment. the generating (101) may be implemented as follows. Based on different instances of the content management service operations, shareable information and variable fields of a plurality of content management service operations are determined, and a batch process template is generated based on the shareable information and variable fields. Then, a request, for creating the batch process template is sent (102) to the server, where the request at least includes a representation of the generated batch process template. The request may be sent, for example through the POST method from the HTTP methods, by posting the new batch process template to the batch process template collection resource. Example (8) shows creating a batch process template, and corresponding example code thereof is shown below.

EXAMPLE CODE (8)

```
POST http://localhost/batch-templates
Content-Type: application/vnd.emc.documentum+json
Accept: application/vnd.emc.documentum+json
{
  "description" : "batch template to create documents"
  "synchronous" : true,
  "transactional" : true,
  "sequential" : true,
  "on-error" : "fail",
  "return-request" : true,
  "operations" : [
  {
    "id" : "$dctm_id",
    "description" : "create document",
    "request" : {
      "method" : "POST",
      "uri" : "${folder}",
      "headers" : [
```

-continued

```
      {"Content-Type" : "application/vnd.emc.documentum+json"},
      {"Accept" : "application/vnd.emc.documentum+json"}
    ],
    "entity" "$[documents]"
    }
  }
 ]
}
```

In the Example (8), since there is only one type of operation, the batch process template only includes one operation template. In the example, in addition to options of the batch, the shareable information of the batch process template includes, operation information, such as "headers", "method". The variables (variable fields) of the batch process template include "id", "uri" and "entity", where "id" is a system defined variable, "uri" is a single variable, and "entity" is a repeating variable. The process of creating the batch process template will be further described below with reference to a plurality of use cases.

Upon receiving the request, the server 20 stores (104) the batch, process template. It may additionally assign an identifier to the batch process template which is uniquely associated with the batch process template, so as to create a new batch process template in the batch process template collection resource. The server 20 then returns (105) the corresponding response back to the client 10.

It would be appreciated that, though the process 100 illustrates that generating (101) the batch process template is implemented at the client, it can also be implemented at other appropriate entities, e.g. the server 20. Accordingly, after creating the batch process template, the server 20 may send the batch process template information to the client 10 automatically or periodically or upon a request from the client 10.

When required to perform the batch process template, the client 10 determines (108) a batch process template to be used, and determines (108) the values of the variable fields (variables). The client 10 may have several ways to determine the batch process template to be used, for example, it may obtain batch process template information through the GET method from the HTTP methods, or may obtain the batch process template from other entities; or it may determine based on the batch process template locally stored in the client 10, etc. The client 10 also needs to determine for example values of fields with variable values and values of fields with repeated values.

The client 10 then sends (116) to the server 20 a request for performing the batch process template. In one embodiment, the client 10 may manipulate the batch resource of the server 20 through the POST method from the HTTP methods, passing the values of the variable fields of the batch process template and information of the determined batch process template to be performed to the server 20 through the POST method, such that the server 20 can perform the corresponding batch process template. In one embodiment, the batch process template requested to be performed may be identified with its identifier. Example (9) illustrates performing the batch process template which, is illustrated for example in the Example (8), and corresponding example code thereof is shown below.

EXAMPLE CODE (9)

```
POST http://localhost/batch-templates/template_id
Content-Type: application/vnd.emc.documentum+json
Accept: application/vnd.emc.documentum+json
{
    "folder" : "http://localhost/folders/folder_xx/documents",
    "documents" : ["{
        \"type\" : \"dm_document\",
        \"properties\" : {
        \"object_name\" : \"document 1\",
        \"title\" : \"my first document\",
        \"keyword\" : \"doc\".
        ...
    }
    }",
    "{
        \"type\" : \"dm_document\",
        \"properties\" : {
        \"object_name\" : \"document 2\",
        \"title\" : \"my second document\",
        \"keyword\" : \"doc\",
        ...
    }
    }",
    //other 998 documents properties
    ]
}
```

In the Example (9), the identifier of the batch process template is the batch process template created for the Example (8), and the Example (9) further provides variable values corresponding to the batch process template of the Example (8). For example, the value of "uri" is "http://localhost/folders/folder_xx/documents". As "id" is a system defined variable, the client 10 need not send value of this variable.

Upon receiving the request for performing the batch process template, the server 20 may determine, from the request, the values of the variable fields and the batch, process template requested to be performed. The server 20 then may perform (120) the batch process template. For example, values of the variable fields are filled into the batch process template identified by the batch process template identifier to perform the batch process, thereby processing a plurality of content management server operations. Hereinafter, the server 20 returns (124) a corresponding response back to the client 10.

Therefore, the batch process of a plurality of content management service operations is enabled in a form of batch process template. The client 10 may further send (128) requests for other batch process template operations to the server 20, operating on the batch process template collection resource or batch resource or both. These requests for template operations may include: a request for obtaining a single batch process template; a request for obtaining all created batch process templates; a request for updating a batch process template; and a request for removing batch process template, etc. Specifically, for example with the HTTP methods described above, the GET method from the HTTP methods is used to obtain all the created batch process templates, the GET method from the. HTTP methods is used to obtain a single batch process template; the PUT method from the HTTP methods is used to update the single batch process template: the DELETE method from the HTTP methods is used to remove a single batch process template, etc.

Upon receiving these batch process template operation requests, the server 20 correspondingly operates (132) the batch process template identified in the request. Subsequently, the server 20 may return (136) a corresponding response back to the client 10. It would be appreciated that the corresponding responses returned (105, 124, 136) by the server 20 back to the client 10 in the process 100 are associated with each of the batch process template operation requests and return the result information of the corresponding batch operation template back to the client 10. The result information may represent different content in accordance with use cases. The details are omitted herein.

In order to further expound the construction of the batch process template, several use cases are described below respectively regarding not using the batch process template and using the batch process template. These use cases are represented in Extendable Markup Language (XML). It will be appreciated that JavaScript Object Notation (JSON) or other forms may be employed.

The first use case is to add a plurality of users to a group. Example code (10) illustrates operations in the batch process in the case of not using the batch process template; and Example code (11) and Example code (12) illustrate operations in the batch process in the case of using the batch process template.

EXAMPLE CODE (10)

```
<?xml version="1.0" encoding="UTF-8"?>
<batch>
    <!-- batch options -->
    <operations>
        <operation id="id-100">
            <request method="POST" uri="http://host:port/dctm-rest/repositories/REPO/groups/mygroup/users">
                <header name="Content-Type" value="application/vnd.emc.documentum+xml"/>
                <header name="Accept" value="application/vnd.emc.documentum+xml"/>
                <entity>
                    <dm:user href=http://localhost./emc-rest/repositories/acme/users/user1/>
                </entity>
            </request>
            <response/>
        </operation>
        <operation id="id-101">
            <request method="POST" uri="http://host:port/dctm-rest/repositories/REPO/groups/mygroup/users">
                <header name="Content-Type" value="application/vnd.emc.documentum+xml"/>
                <header name="Accept" value="application/vnd.emc.documentum+xml"/>
                <entity>
                    <dm:user href=http://localhost/emc-rest/repositories/acme/users/user2/>
                </entity>
            </request>
            <response/>
        </operation>
```

-continued

```
        <!-- more operations here -->
        <operation>
        </operation>
    </operations>
</batch>
```

EXAMPLE CODE (11)

```
<?xml version="1.0" encoding="UTF-8"?>
<batch-template>
    <!-- batch options -->
    <description/>
    <operations>
        <operation id="$dctm__id">
            <request method="POST" uri="${group-users-uri}">
                <header name="Content-Type" value="$dctm__mediatype__single"/>
                <header name="Accept" value="$dctm__mediatype__single"/>
                <entity>$[user-uri]</entity>
            </request>
        </operation>
    </operations>
</batch-template>
```

EXAMPLE CODE (12)

```
<batch-template-value>
    <group-users-uri>http://host:port./dctm-rest/repositories/REPO/groups/mygroup1/users</group-users-uri>
    <user-uri>
        <item><dm:user href=http://localhost/emc-rest/repositories/acme/users/myuser1/>
        </item>
        <item><dm:user href=http://localhost/emc-rest/repositories/acme/users/myuser2/>
        </item>
        <item><dm:user href=http://localhost/emc-rest/repositories/acme/users/myuser3/>
        </item>
    </user-uri>
</batch-template-value>
```

It is seen from a comparison of Example (10) to Example (12) that, when a plurality of users are added to the group, "uri" (the user group URI) and "method" of a plurality of operations in the batch process are identical, and "request body" are different. Accordingly, in the representation of the batch process template as shown in the Example (11), the "method" is determined as a fixed "POST" method, the "uri" is determined as a single variable so as to flexibly set the user group, and the "user uri" in the "request body" is determined as a repeating variable. Moreover, the "operation id" is determined as a system defined variable for the operation ID, as described above, and the media type is determined as a system defined variable for a media type, as described above. After generating the batch process template as in the Example (11), the batch process template is posted to the batch process template collection resource with the POST method, as described in the process 100 in combination of the step 102, so as to create the batch process template.

On the other hand, in the corresponding batch process template value representation as shown in the Example (12), values of variables other than the system defined variable is provided, i.e., the URI of the user group and the value of the URI of the user are provided. Hereinafter, as described in the process 100 in combination of the step 116, values of the batch process template variables may be posted to the batch process template resource to execute the batch process template with the POST method.

The second use case is to delete a plurality of objects. Example code (13) illustrates operations in the batch process in the case of not using the batch process template; and Example code (14) and Example code (15) illustrate operations in the batch process in the case of using the batch process template.

EXAMPLE CODE (13)

```
<?xml version="1.0" encoding="UTF-8"?>
<batch>
    <!-- batch options -->
    <operations>
        <operation id="id-100">
            <request method="DELETE" uri="http://host:port/dctm-rest/repositories/REPO/objects/12345">
                <header name="Accept" value="application/vnd.emc.documentum+xml"/>
            </request>
            <response/>
        </operation>
        <operation id="id-101">
            <request method="DELETE" uri="'http://host:port/dctm-rest/repositories/REPO/objects/67890">
                <header name="Accept" value="application/vnd.emc.documentum+xml"/>
            </request>
            <response/>
        </operation>
        <!-- more operations here -->
        <operation>
        </operation>
    </operations>
</batch>
```

EXAMPLE CODE (14)

```
<?xml version="1.0" encoding="UTF-8"?>
<batch-template>
    <!-- batch options -->
    <description/>
    <operations>
        <operation id="$dctm_id">
            <request method="DELETE" uri="$[object-uri]">
                <header name="Accept"
```

-continued

```
                    value="$dctm_mediatype_single"/>
            </request>
        </operation>
    </operations>
</batch-template>
```

EXAMPLE CODE (15)

```
<batch-template-value>
    <object-uri>
        <item>http://host:port/dctm-rest/repositories/REPO/objects/id1</item>
        <item>http://host:port/dctm-rest/repositories/REPO/objects/id2</item>
        <item>http://host:port/dctm-rest/repositories/REPO/objects/id3</item>
    </object-uri>
</batch-template-value>
```

It is seen from a comparison of Example (13) to Example (15), when a plurality of objects are deleted, the "method" may be determined as a fixed "DELETE" method, the "operation ID" may be determined as a system defined variable for the operation ID as described above, the media type may be determined as a system defined variable for the media type as described above, and the "uri" (URI of the object) may be determined as a repeating variable as described above so as to perform operations on a plurality of objects. After generating the batch process template of the Example (14), the batch process template may be posted to the batch process template collection resource, as described in the process 100 in combination of the step 102, so as to create the batch process template. On the other hand, in the corresponding batch process template value representation as shown in the Example (15), a value of a variable other than the system defined Variable is provided, i.e., the value of the URI of the object is provided. Subsequently, as described in the process 100 in combination of the step 116, the value of the batch process template variable is posted to the batch process template resource to perform the batch process template.

A third use case is to create a plurality of objects under a same folder. Example code (16) illustrates operations in the batch process in a case of not using the batch process template; and Example code (17) and Example code (18) illustrate operations in the batch process in a case of using the batch process template.

EXAMPLE CODE (16)

```
<?xml version="1.0" encoding="UTF-8"?>
<batch>
    <!-- batch options -->
    <operations>
        <operation id="id-100">
            <request method="POST" uri="http://host:port/dctm-rest/repositories/REPO/folders/0b123">
                <header name="Content-Type" value="application/vnd.emc.documentum+xml"/>
                <header name="Accept" value="application/vnd.emc.documentum+xml"/>
                <entity>
                    <object>
                        <properties>
                            <object_name>obj 1</object_name>
```

```
            </properties>
          </object>
        </entity>
        <attachment><xop:Include
xmlns:xop='http://www.w3.org/2004/08/xop/include'
href='cid:id-100-content'/></attachment>
      </request>
      <response/>
    </operation>
    <operation id="id-101">
                              <request        method="POST"
uri="http://host:port/dctm-rest/repositories/REPO/folders/0b123"
>
                <header        name="Content-Type"
value="application./vnd.emc.documentum+xml"/>
                <header        name="Accept"
value="application/vnd.emc.documentum+xml"/>
        <entity>
          <object>
            <properties>
              <object_name>obj 2</object_name>
            </properties>
          </object>
        </entity>
        <attachment><xop:Include
xmlns:xop='http://www.w3.org/2004/08/xop/include'
href='cid:id-101-content'/></attachment>
      </request>
      <response/>
    </operation>
    <!-- more operations here -->
    <operation>
    </operation>
  </operations>
</batch>
```

EXAMPLE CODE (17)

```
<?xml version="1.0" encoding="UTF-8"?>
<batch-template>
  <!-- batch options -->
  <description/>
  <operations>
    <operation id="$dctm_id">
      <request method="POST" uri="${folder-objects-uri}">
        <header            name="Content-Type"
value="$dctm_mediatype_single"/>
        <header name="Accept"
value="$dctm_mediatype_single"/>
        <entity>$[object-properties]</entity>
        <attachment><xop:Include
xmlns:xop='http://www.w3.org/2004/08/xop/include'
href='$[cid]'/></attachment>
      </request>
    </operation>
  </operations>
</batch-template>
```

EXAMPLE CODE (18)

```
<batch-template-value>
<folder-objects-uri>http://host:port/dctm-rest/repositories/REPO
/folders/folder1/objects</folder-objects-uri>
  <object-properties>
    <item><object><properties><object_name>obj
1</object_name></properties></object></item>
    <item><object><properties><object_name>obj
2</object_name></properties></object></item>
  </object-properties>
  <cid
```

-continued

```
    <item>cid:100</item>
    <item>cid:101</item>
  </cid:>
</batch-template-value>
```

It is seen from a comparison of the Example (16) to the Example (18) that, when a plurality of objects are created under the same folder, the "method" may be determined as a fixed "POST" method, the "operation id" may be determined as the system defined variable of the operation ID as described above, the media type may be determined as the system defined variable for the media type as described above, the "uri" (URI of the folder object) may be determined as the single variable, "href" as an object of an attachment and an attribute "object name" of the object may be determined as repeating variables. After generating the batch process template of the Example (17), the batch process template is posted to the batch process template collection resource, as described in the process 100 in combination of the step 102, so as to create the batch process template. On the other hand, in the corresponding batch process template value representation as shown in the example (18), variable values other than the system defined variable is provided, i.e., values of the attribute "object name" of the object and "href" are provided. Subsequently, the values of the batch process template variables may be posted to the batch process template resource, as described in the process 100 in combination of the step 116, so as to execute the batch process template.

A fourth use case is to add one user to a plurality of groups. Example code (19) illustrates operations in the batch process in the case of not using the batch process template:, and Example code (20) and Example code (21) illustrate operations in the batch process in the case of using the batch process template.

EXAMPLE CODE (19)

```
<?xml version="1.0" encoding="UTF-8"?>
<batch>
    <!-- batch options -->
    <operations>
        <operation id="id-100">
            <request method="POST" uri="http://host:port/dctm-rest/repositories/REPO/groups/mygroup1/users">
                <header name="Content-Type" value="application/vnd.emc.documentum+xml"/>
                <header name="Accept" value="application/vnd.emc.documentum+xml"/>
                <entity>
                    <dm:user href=http://localhost/emc-rest/repositories/acme/users/myuser/>
                </entity>
            </request>
            <response/>
        </operation>
        <operation id="id-101">
            <request method="POST" uri="http://host:port/dctm-rest/repositories/REPO/groups/mygroup2/users">
                <header name="Content-Type" value="application/vnd.emc.documentum+xml"/>
                <header name="Accept" value="application/vnd.emc.documentum+xml"/>
                <entity>
                    <dm:user href=http://localhost/emc-rest/repositories/acme/users/myuser/>
                </entity>
            </request>
            <response/>
        </operation>
        <!-- more operations here -->
        <operation>
        </operation>
    </operations>
</batch>
```

EXAMPLE CODE (20)

```
<?xml version="1.0" encoding="UTF-8"?>
<batch-template>
    <!-- batch options -->
    <description/>
    <operations>
        <operation id="$dctm__id">
            <request method="POST" uri="$[group-users-uri]">
                <header name="Content-Type" value="$dctm__mediatype__single"/>
                <header name="Accept" value="$dctm__mediatype__single"/>
                <!-- the entity can also be defined as a variable, to add differnt user to the groups -->
                <entity><dm:user href=http://localhost/emc-rest/repositories/acme/users/myuser1/>
                </entity>
            </request>
        </operation>
    </operations>
</batch-template>
```

EXAMPLE CODE (21)

```
<batch-template-value>
    <group-users-uri>
        <item>http://host:port/dctm-rest/repositories/REPO/groups/mygroup1</item>
        <item>http://host:port/dctm-rest/repositories/REPO/groups/mygroup2</item>
        <item>http://host:port/dctm-rest/repositories/REPO/groups/mygroup3</item>
    </group-users-uri>
</batch-template-value>
```

A fifth use case is to remove a plurality of users from one group and add the same to another group. Example code (22) and Example code (23) respectively illustrate a batch process template representation and a corresponding batch process template value representation.

EXAMPLE CODE (22)

```
<?xml version="1.0" encoding="UTF-8"?>
<batch-template>
    <!-- batch options -->
    <description/>
    <operations>
        <operation id="$dctm__id">
            <request method="POST" uri="${group-users-uri-1}">
                <header name="Content-Type" value="$dctm__mediatype__single"/>
                <header name="Accept" value="$dctm__mediatype__single"/>
                <entity>$[user-uri]</entity>
            </request>
        </operation>
        <operation id="$dctm__id">
            <request method="DELETE" uri="${group-users-uri-2}">
                <header name="Accept" value="$dctm__mediatype__single"/>
                <entity>$[user-uri]</entity>
            </request>
        </operation>
    </operations>
</batch-template>
```

EXAMPLE CODE (23)

```
<batch-template-value>
    <group-users-uri-1>http://host:port/dctm-rest/repositories/REPO/groups/mygroup1/users</group-users-uri-1>
    <group-users-uri-2>http://host:port/dctm-rest/repositories/REPO/groups/mygroup1/users</group-users-uri-2>
    <user-uri>
        <item><dm:user href=http://localhost/emc-rest/repositories/acme/users/myuser1/>
        </item>
        <item><dm:user href=http://localhost/emc-rest/repositories/acme/users/myuser2/>
        </item>
        <item><dm:user href=http://localhost/emc-rest/repositories/acme/users/myuser3/>
        </item>
    </user-uri>
</batch-template-value>
```

It is seen from a comparison of the Example (19) to the Example (23) that the batch process template may flexibly include a plurality of different operation methods in the batch process template, and may flexibly determine different types of variables, so as to adapt to various different use case scenarios.

The above describes embodiments of the present disclosure in detail with reference to various example embodiments and the process 100. Operations at the client 10 and the server 20 are described briefly below referring to FIGS. 2 and 3. Specifically, FIG. 2 illustrates a flowchart of a method implemented at the client 10, and FIG. 3 illustrates a flowchart of a method implemented correspondingly, at the server 20.

Figure 2:
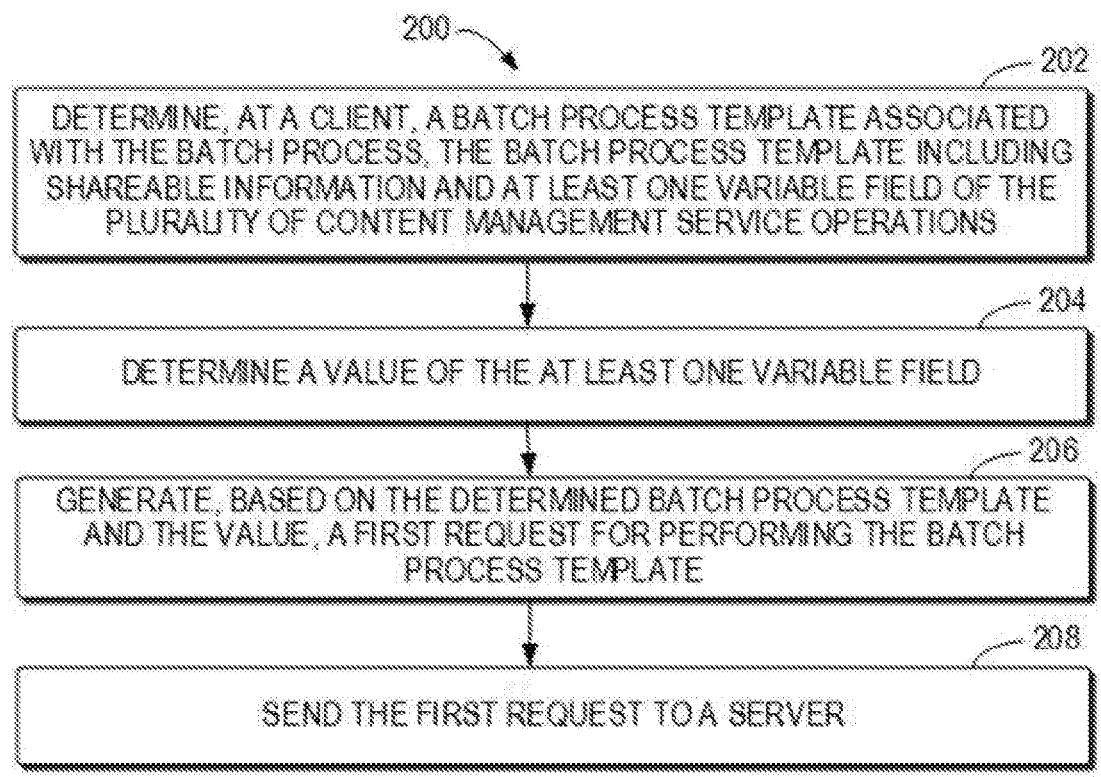
FIG. 2 illustrates a flowchart of a method implemented at a client according to an embodiment of the present disclosure.

As shown in FIG. 2, at 202, a batch process template associated with a batch process is determined at the client, and the batch process template includes shareable information and variable fields of a plurality of content management service operations. As described above, the client 10 may determine the batch process template to be used in a plurality of manners. For example, the GET method from the HTTP methods may be used to obtain the batch process template information, or the batch process template may be obtained from other entities; or it may determine based on the batch process template locally stored by the client 10, etc.

Next, at 204, a value of a variable field is determined. The client 10 further needs to determine for example a value of a field with a variable value and a value of a repeating field based on variable fields (variables) of different types defined in the template. At 206, a first request for performing the batch process template is generated based on the batch process template and the variable field value. Then, at 208, the first request is sent to the server to perform the batch process template and correspondingly perform a plurality of content management service operations. In one embodiment, the client 10 sends, through the POST method, to the server 20 the value of the variable field of the batch process template and the information of the determined batch process template to be performed, such that the server 20 can perform the corresponding batch process template.

Figure 3:
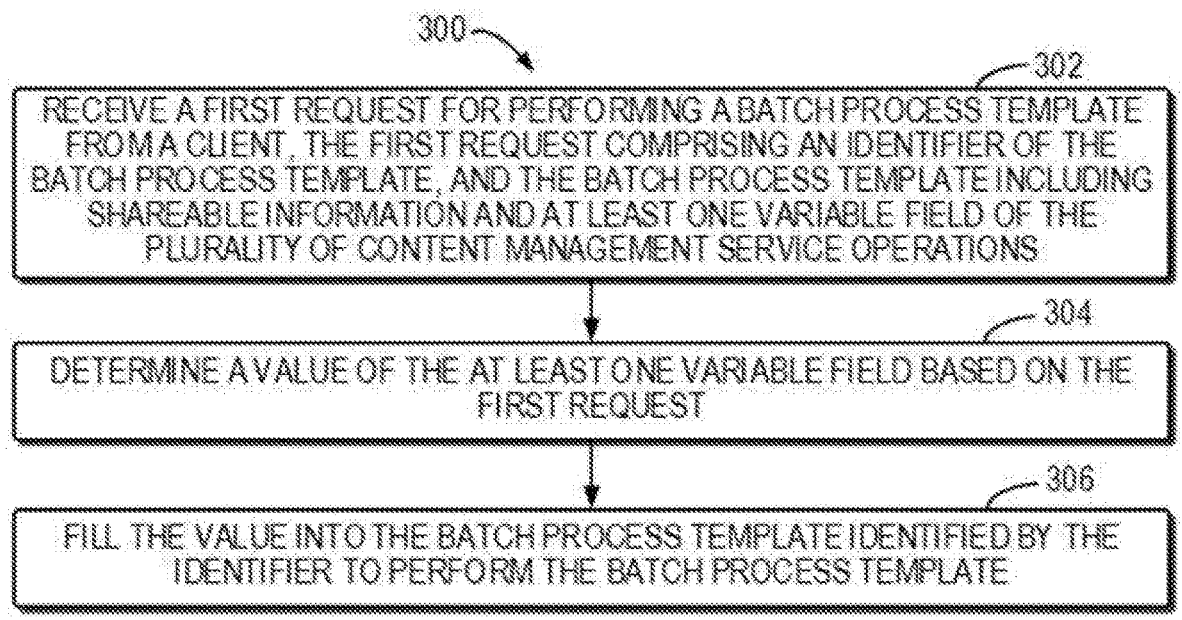
FIG. 3 illustrates a flowchart of a method implemented at a server according to an embodiment of the present disclosure.

At the server 20, as shown in FIG. 3, at 302, a first request for performing the batch process template is received from the client. The first request includes an identifier of the batch process template, and the batch process template includes shareable information and variable fields of a plurality of content management service operations. At 304, based on the first request, values of variable fields are determined. In one embodiment, the first request may carry values of variable fields, and the server 20 may thus directly obtain the values of the variable fields from the first request. In another embodiment, the first request may indicate information associated with the values of variable fields, and the server 20 may obtain or derive the values of the variable fields based on the first request.

Next, at 306, the values of the variable fields are filled into the batch process template identified by an identifier to execute the batch process template. The server 20 may retrieve the batch process template based on the first request, and fill the values of the corresponding variable fields into the batch process template, so as to perform a plurality of content management service operations in a batch process.

Figure 4:
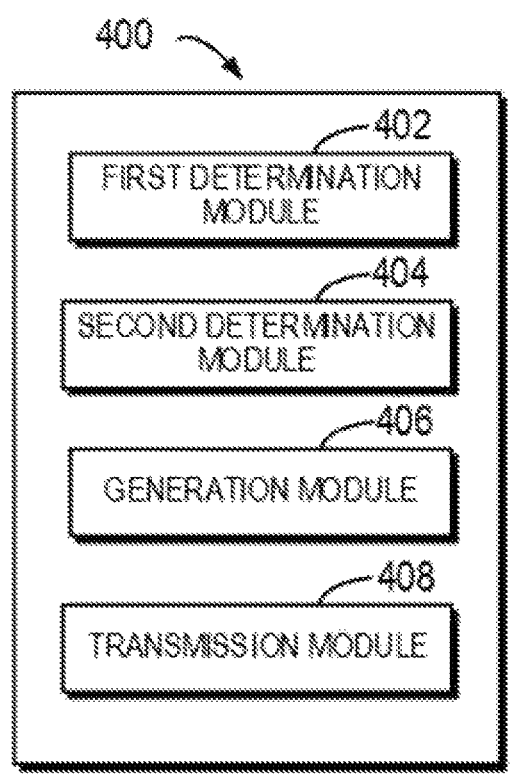
FIG. 4 illustrates a schematic block diagram of a client according to embodiments of the present disclosure.

FIG. 4 illustrates an example structural diagram of an apparatus 400 for processing, a batch of a plurality of service operations according to embodiments of the present disclosure. In one example, the apparatus 400 may be implemented as a client (e.g. a client 10) or a portion thereof. The apparatus 400 is operable to perform the process 100 as described with reference to FIG. 1 and the method 200 as described in FIG. 2, as well as any other processing and methods.

The apparatus 400 comprises: a first determination, module 402 configured to determine a batch process template associated with a batch process, where the batch process template includes shareable information and variable fields of a plurality of content management service operations; a second determination module 404 configured to determine values of variable fields; a generation module 406 configured to generate a first request for performing the batch process template based on the determined batch process template and the values of variable fields; and a transmission module 408 configured to send the first request to the server to perform the batch process template and correspondingly to perform a plurality of content management service operations.

Figure 5:
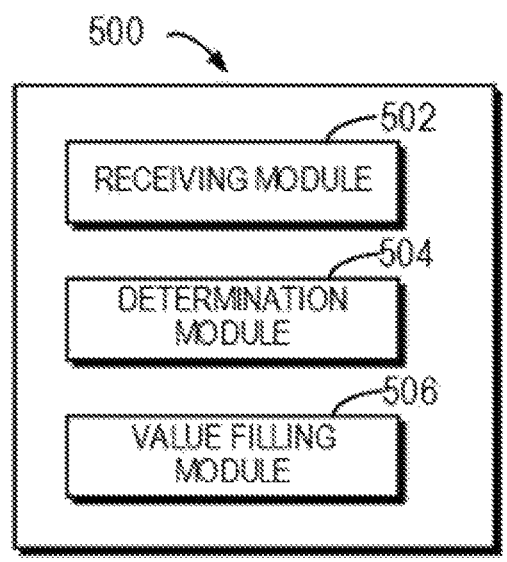
FIG. 5 illustrates a schematic block diagram of a server according to embodiments of the present disclosure.

FIG. 5 illustrates an example structural diagram of an apparatus 500 for processing a batch of a plurality of content service operations according to embodiments of the present disclosure. In one embodiment, the apparatus 500 may be implemented as a server (e.g. a server 20) or a portion thereof. The apparatus 500 is operable to execute the process 100 as described with reference to FIG. 1 and the method 300 as described in FIG. 3, as well as any other processing and methods.

The apparatus 500 comprises: a receiving module 502 configured to receive a first request for performing a batch process template from a client, where the first request includes an identifier of the batch process template and the batch process template includes shareable information and variable fields of a plurality of content management service operations; a determination module 504 configured to determine values of variable fields; and a value filling module 506 configured to fill values of the variable fields into the batch process template identified by an identifier to perform the batch process template.

It will be appreciated that each module as included in the apparatus 400 and 500 correspond to each step in the method and/or communication process 100, 200 and 300 as described with reference to FIGS. 1, 2 and 3. Therefore, the operations and features as described with reference to FIGS. 1, 2 and 3 are also applicable to the devices 400 and 500 and the modules included therein, and produce the same effect. The details are omitted herein.

Figure 6:
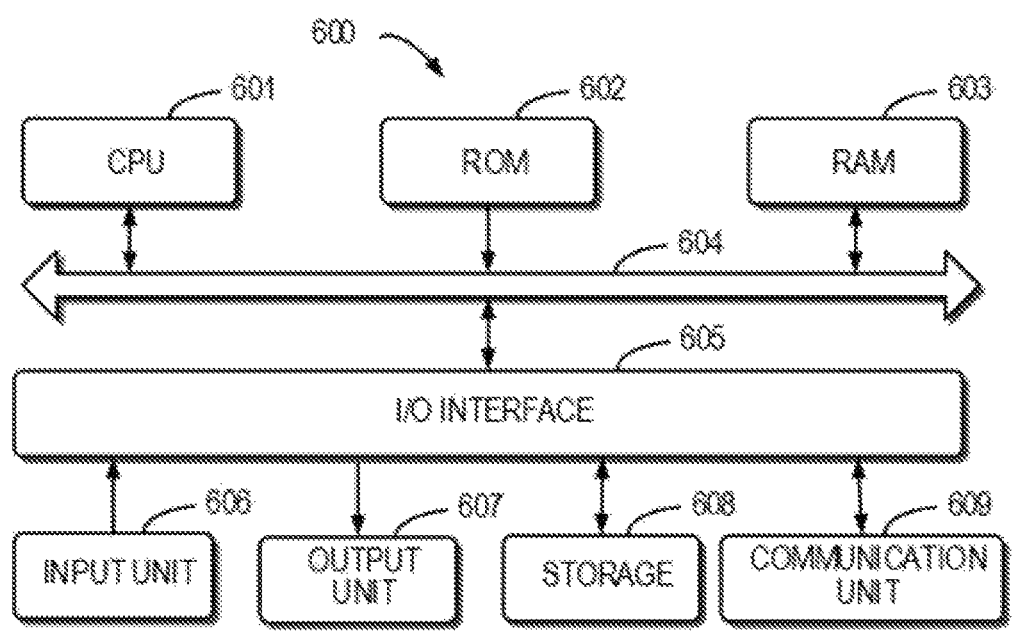
FIG. 6 illustrates a schematic block diagram of a device according to another embodiment of the present disclosure.

FIG. 6 illustrates a schematic block diagram of a device 600 for implementing embodiments of the present disclosure, and the device 600 may be used to implement the apparatus for processing a batch process of a plurality of service operations, which for example includes the client 10 or the server 20, as described above. As shown, the device 600 includes a central processing unit (CPU) 601, which may execute various appropriate acts and processing based on computer program instructions stored in a read-only memory (ROM) 602 or computer program instructions loaded from a storage unit 1408 to a random access memory (RAM) 603. In the RAM 603, various programs and data needed for operations of the apparatus 600 may be stored. CPU 601, ROM 602 and RAM 603 are connected to one another via a bus 604. An input/output (I/O) interface 605 is also connected to the bus 604.

The following components in the device 600 are connected to the I/O interface 605: an input unit 606 such as a keyboard, a mouse and the like; an output unit 607 including various kinds of displays and a loudspeaker, etc.; a memory unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

In some embodiments, the processing unit 601 may be configured to execute various processes and processing as described above, e.g., methods/processes 100, 200 and 300. For example, in some embodiments, the methods/processes 100, 200 and 300 may be implemented as a computer software program that is tangibly included in a machine readable medium, e.g., the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the methods/processes 100, 200 and 300 as described above may be executed.

According to one embodiment of the present disclosure, a computer readable storage medium is provided, comprising computer readable program instructions stored thereon for implementing the methods/processes 100, 200 and 300 according to the present disclosure.

The solution of performing a batch for a plurality of content management service operations based on a batch process template, as provided in embodiments of the present disclosure, may at least have the following advantages; the batch process template can be saved and reused, such that the batch process template can be maintained efficiently, and that only some variable values are provided in use, which not only promotes the efficient work flow but also decreases the data processing error; with a template extension, users need not define a plurality of operations for the same type, such that the template is set more easily. The template may be extended by the repeating variable, and each repeating variable value generates an actual operation. Additionally, the batch process template is easy to use and has a high flexibility and compatibility.

Although the above description and teaching given in the relevant drawings, various modifications and other embodiments of the present disclosure illustrated herein will be realized by those skilled in the related field of the present disclosure. Accordingly, it would be appreciated that the embodiments of the present disclosure are not limited to the detailed embodiments of the present disclosure, and modifications and other embodiments are to be included in the scope of the present disclosure. Besides, although the above description and the relevant drawings describe the example embodiments in a background of certain example combinations of components and/or functionality, it should be realized that an alternative embodiment may provide different combinations of components and/or functionality without departing from the scope of the present disclosure. As far as this point concerned, for example, other combinations of components and/or functionality, somewhat different from the above explicit description, are anticipated to fall into the scope of the present disclosure. Despite use of specific terms herein, they are used only with general and descriptive meanings but do not intend to make any limitation.

We Claim:

1. A method of processing a batch process including a plurality of content management system service operations, comprising:
creating a batch process template by:
determining, at a client, shareable information and at least one variable field of the plurality of content management system service operations;
generating, at the client, the batch process template based on the shareable information and the at least one variable field: and
sending, from the client to a server, a first request for creating the batch process template, the first request at least including a representation of the generated batch process template;
subsequently, choosing, at the client, the batch process template associated with the batch process from a plurality of batch process templates, the batch process template including the shareable information and the at least one variable field;
determining, at the client, a value of the at least one variable field;
generating, at the client, based on the determined batch process template and the value, a second request for performing the batch process template;
sending the second request from the client to the server;
receiving, by the server, the second request from the client, the second request including an identifier of the batch process template and the value of the at least one variable field;
determining, by the server, the value of the at least one variable field based on the second request; and
filling, by the server, the determined value into the batch process template identified by the identifier and performing, by the server, the batch process template with the determined value filled in to perform the plurality of content management service operations in the batch process.

2. The method according to claim 1, further comprising:
sending to the server at least one of the following requests for template operations:
a request for obtaining a single batch process template;
a request for obtaining all created batch process templates;
a request for updating a batch process template; and
a request for removing a batch process template.

3. The method according to claim 1, wherein the choosing of the batch process template comprises:
sending a third request for obtaining a batch process template;
receiving a response to the third request, the response including the plurality of batch process templates; and
determining the batch process template based on the response.

4. The method according to claim 1, wherein the shareable information at least includes: operation features of the batch process obtained based on processing requirements for the plurality of content management system service operations, and common information shared by the plurality of content management system service operations, the common information being obtained based on content items of the plurality of content management system service operations.

5. The method according to claim 1, wherein the batch process template includes different types of variable fields obtained based on content items of the plurality of content management system service operations, the different types including at least one of a system defined type, a single-value type, and a value repeating type.

6. The method according to claim 1, wherein generating the second request includes generating the second request in a RESTful (REpresentational State Transfer) style using hypertext transfer protocol (HTTP) methods.

7. A system for processing a batch process including a plurality of content management system service operations, the system comprising:

a server apparatus: and
a client apparatus including:
    a processor; and
    a memory coupled to the processor, the memory, with the processor, being configured to cause the client apparatus to perform acts comprising:
        creating a batch process template by:
            determining shareable information and at least one variable field of the plurality of content management system service operations;
            generating the batch process template based on the shareable information and the at least one variable field; and
            sending, to the server apparatus, a first request for creating the batch process template, the first request at least including a representation of the generated batch process template;
        subsequently, choosing the batch process template associated with the batch process from a plurality of batch process templates, the batch process template including the shareable information and the at least one variable field;
        determining a value of the at least one variable field;
        generating, based on the determined batch process template and the value, a second request for performing the batch process template; and
        sending the second request to the server apparatus;
wherein the server apparatus is configured to:
receive the second request from the client apparatus, the second request including an identifier of the batch process template and the value of the at least one variable field;
determine the value of the at least one variable field based on the second request; and
fill the determined value into the batch process template identified by the identifier and perform the batch process template with the determined value filled in to perform the plurality of content management service operations in the batch process.

8. The system according to claim 7, the acts further comprising:
    sending to the server apparatus at least one of the following requests for template operation:
        a request for obtaining a single batch process template;
        a request for obtaining all created batch process templates;
        a request for updating a batch process template; and
        a request for removing a batch process template.

9. The system according to claim 7, wherein the choosing of the batch process template comprises:
    sending a third request for obtaining a batch process template;
    receiving a response to the third request, the response including the plurality of batch process templates; and
    determining the batch process template based on the response.

10. The system according to claim 7, wherein the shareable information at least includes: operation features of the batch process obtained based on processing requirements for the plurality of content management system service operations, and common information shared by the plurality of content management system service operations, the common information being obtained based on content items of the plurality of content management system service operations.

11. The system according to claim 7, wherein the batch process template includes: different types of variable fields obtained based on content items of the plurality of content management system service operations, the different types including at least one of a system defined type, a single-value type, and a value repeating type.

* * * * *